Aug. 31, 1965   F. RODIS ETAL   3,203,776
PROCESS FOR PRODUCING A HIGHLY POROUS MASS FROM SHORT SLAG
Filed Nov. 29, 1963
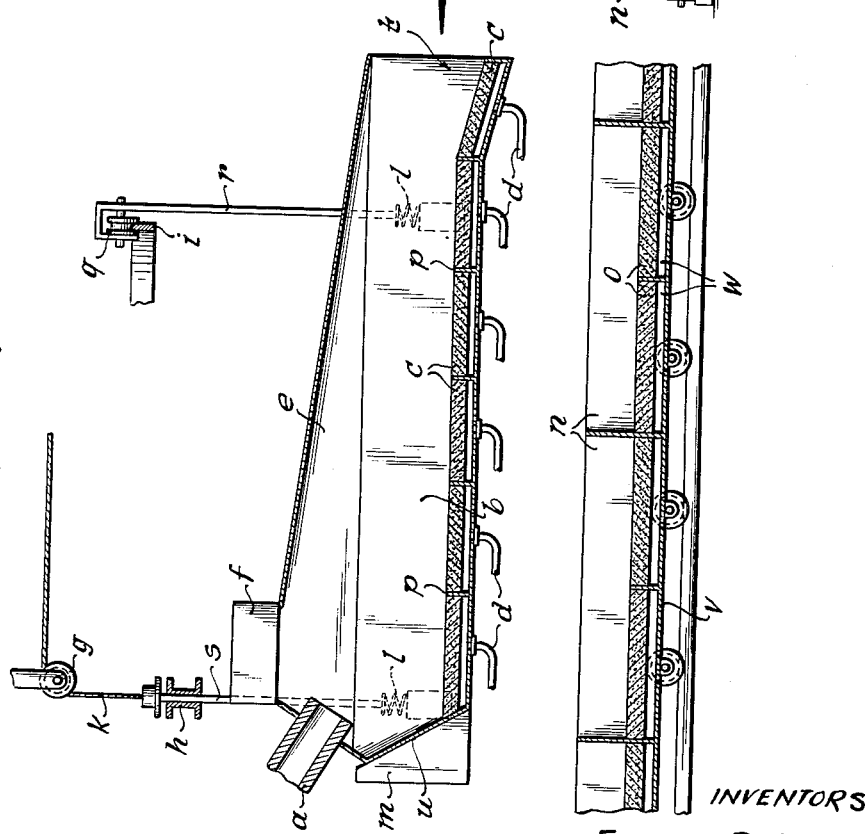
INVENTORS
Franz Rodis
Arnulf Hinz
Friedrich Thomas
*Connolly and Hutz*
ATTORNEYS 3,203,776
PROCESS FOR PRODUCING A HIGHLY POROUS MASS FROM SHORT SLAG
Franz Rodis, deceased, late of Bad Hersfeld, Germany, by Hildegard Rodis nee Arend, heiress, Bad Hersfeld, Germany, Arnulf Hinz, Knapsack, near Cologne, and Friedrich Thomas, Hermulheim, near Cologne, Germany, assignors to Knapsack-Griesheim Aktiengesellschaft, a corporation of Germany
Filed Nov. 29, 1963, Ser. No. 327,879
2 Claims. (Cl. 65—20)

This is a continuation-in-part application of application S.N. 815,715, filed May 25, 1959 now abandoned.

The present invention relates to a process for the production of a mass having most of its pores closed by treating a "short" type slag, which is liquid in the molten state and is solidified within a narrow temperature interval with water, steam and/or air. The liquid slag is passed over porous plates or spray nozzles.

The specific slag to be foamed is a waste product of electrothermal phosphate to reduction furnaces. The ratio of calcium oxide to silicon dioxide in the foamed slag is about 47:43. The slag consists of about 90% calcium metasilicate, about 3% aluminum oxide, about 6% calcium fluoride and up to about 1% manganese and alkali metal oxides.

It is known how to foam liquid blast-furnace slag and convert it into a solid porous mass by the action of water, steam and air. Furthermore, a number of foaming devices are known, such as trough wheels, foam wheels, foam trough, foam plate conveyor, moist casting bed and many more. In addition, it is known how to cause water, steam and air to react separately or jointly with liquid slag using porous plates or spray nozzles.

All these prior blast-furnace slags, treated as mentioned above, however, contain in addition to high percentages of CaO and $SiO_2$ also large amounts of $Al_2O_3$. According to Lea and al., "Chemistry of Cement and Concrete," published 1956 by Edward Arnold, Ltd., London, chapter XV, page 398, these prior slags treated have the following average composition: lime 30 to 50%, silica 28 to 38%, alumina 8 to 24%, magnesia 1 to 18%, sulphur 1 to 2.5%, ferrous and manganese oxides 1 to 3%.

It is known, moreover, that large amounts of $SiO_2$ and $Al_2O_3$ will increase the solidification interval and viscosity of a slag considerably, thereby giving the mass a ropy consistency. This viscosity decreases in the presence of metal oxides, such as FeO, MnO, MgO and sulfides which act as fluxes and confine the transition from the liquid to the solid phase to a narrow temperature range.

Besides these blast-furnace slags, there are also slags which contain only small amounts of $Al_2O_3$ and do not have a ropy consistency, for which reason they are called short slags. These are the slags dealt with in the present invention. A specific characteristic feature of applicants' slag defined as being "short" is the small temperature interval between the onset and the end of solidification. Merely within this small temperature interval is the foaming process of the present application possible to form the desired foamed slag having all of its pores substantially closed. When treated with conventional equipment or by known processes, these short slags cannot be converted into foam, or only very poorly so, yielding foam slags of high bulk density. When a slag of this short type also contains $CaF_2$ as flux then the solidification range becomes so limited that, in general, the slag cannot be converted into foam. A short slag of this kind does not swell in the spoon test, where a spoon filled with liquid slag is poured on moist sand or water, nor are threads formed in the hook test. It is essential, therefore, to cool a short slag to the point where foaming will occur within its liquefaction range because only in this short temperature interval between the beginning and ending of the solidification period will the slag be viscous. It has now been found that this narrow temperature range is 1200–1600° C., preferably 1400–1500° C.

To achieve this, foam formation in accordance with the invention is carried out in several stages. In the first step water, steam and air—one, two or all three of the components together—are reacted with the hot liquid short slag in a cooling trough subdivided into several sections according to one of the known methods. Here the liquid slag is gradually cooled to temperatures of 1200–1600° C., preferably 1400–1500° C. to form a pulplike or creamy mass, the slag being interspersed with tiny gas bubbles, particularly air bubbles. The quantity of the individual foaming agents used is controlled in such a way that the slag leaving the trough channel, though still liquid, is just on the point of solidifying.

As the second step, a foam conveyor or a row of foam cars are provided where foaming of the slag continues. Here, water is preferably used as foaming agent. The slag will foam here again and then solidify instantaneously. The foam train is equipped in known manner with porous plates or moist sand serving as water supply. This arrangement allows continuous foaming of the short slag which at the usual grain size of 7–15 mm. has a bulk density of 0.5.

It is advantageous to use in the first stage of foaming a swiveling trough channel in order to fill the foam cars used in the second step along their entire width with the viscous mass. The inclination of the trough channel can be adjusted in order to control the pre-foaming time. The trough channel is provided with a vibrator to remove firmly adhering crusts that might form.

It is desirable suitably to equip cooling trough and foam train with carbon plates permeable to gas. In all the stages the carbon plates should preferably be impregnated with residue-free water.

For the last step, water alone can be used as foaming agent.

While blast-furnace slags foamed according to the conventional foaming method will yield a slag foam that coagulates constantly until solidification sets in due to the long solidification interval, short slags give a lasting, stiff foam. Hence the method in accordance with the invention has the advantage of yielding a foam slag with closed pores, whereas hitherto-available commercial foam slag obtained from blast-furnace slags almost invariably has open pores.

A further advantage of the process according to the invention is the fact that the slag during the second step of the after-foaming operation and subsequent solidification no longer comes into contact with excess water and is quenched. Therefore, no slag grit or more less soft granulate is formed as in the case of known methods, but coarse pieces of foam slag are produced.

In the attached drawing, a form of embodiment of an installation for carrying out the process according to the invention is illustrated:

FIG. 1 is a longitudinal section of the apparatus shown in line I—I of FIG. 2; and FIG. 2 is a front view partially in section of this apparatus shown in the direction of the arrow II in FIG. 1.

The slag passes through feed channel $a$ to the cooling and pre-foaming trough $b$ lined with porous carbon plates $c$ where it is cooled to a temperature between 1200–1600° C., preferably 1400–1500° C. Instead of the carbon plates $c$, perforated tubes or pipelines with nozzles or carbon plates with nozzles combined can be used. Below the carbon plates $c$, all fastened to boxes $p$ separated from one another, feeding pipes $d$ are arranged, conducting water, steam and air to the plates. Because of the vigorous squirting, caused by the reaction of cooling media and slag, the cooling trough *b* is covered with a hood *e* and at the same time connected with a ventilator (not shown in the drawing) by means of an exhaust outlet *f* which sucks up the vapor generated and the gases formed. By means of inlet pipes *d*, the cooling media can be regulated from the charging platform in such a manner that slag leaving the cooling trough which is visible to the service man will be cooled off and prefoamed to such an extent as to leave the cooling trough *b* and enter the car train *n* as a foam of creamlike consistency. Since, on foaming, the slag increases considerably in volume, the car train *n*, in order to diminish the required length of the car train or box conveyor, is designed about six times as wide as cooling trough *b*. But since the slag cream leaving the cooling trough *b* is no longer liquid enough to spread over the entire surface of car train *n*, the cooling trough is suspended from a bearing *h* at slag feeding inlet *u* so as to be able to revolve while at outlet end *t* it is fastened to a yoke *r*, and via roller *q* is supported by a circular rail *i*, so as to be able to swing. By means of a rope pulley *k* the height of the yoke *s* at the feeding inlet *u* can be adjusted with roller *g*. The angle of inclination of cooling trough *b* is thus adjustable and the time of pre-foaming of the slag in cooling trough *b* can thereby be increased or shortened within definite limits.

When cooling is too intense or feeding of the slag irregular, a still doughy slag or a partly solidified slag may settle at the walls and thus hinder the free passage of the liquid slag. To prevent deposits of this almost solidified slag, cooling trough *b* is suspended from springs *l* and a vibrator, not shown, is mounted on bracket plate *m* to which the springs are attached.

Car train *n* is also equipped with porous carbon plates *o*. For storage of water, a free space *w* is left between carbon plates *o* and car floor *v*. As known, instead of carbon plates moist sand or similar material can be used. The car train shown here can be designed as box conveyer as well. When the slag has passed into the car of the train, steam evolves from the water contained in the porous carbon plates, such steam again causing the slag cream to swell until it finally solidifies. If this were not so and the bottom layer, for example, were not porous and moist or consisted of smooth sheet metal, then the foam produced would at the very least coalesce into a uniform melt in its lower layers and solidify without pores. The foam formed in the first step, although already very viscous, still tends to settle.

It is advantageous to use porous plates of carbon with which the slag does not combine, thus easily detaching itself when the car is tipped.

Water free of all residue, e.g. condenser water, is suitably used for impregnating the plates, since with repeated use, the pores of the plates will become plugged and lose their capability to absorb.

It is understood that the process in accordance with the invention can also be carried out with equipment of different construction as far as said equipment allows of carrying out the foaming operation of slag in two stages according to the invention.

The process of the invention for the production of a highly porous mass by treating a slag of the short type, which is liquid in the molten state and solidifies within a narrow temperature interval, with water, steam and/or air by passing the liquid slag over porous plates or spray tubes thus consists in performing the foaming operation in two stages. In the first step the liquid slag is poured into a cooling trough and treated with water, steam and/or air until it is converted into a doughy state and in the second step the still pulpy slag which is interspersed with steam and/or air bubbles is uniformly spread on a continuously moving foam conveyer or foam train where it is treated with a foaming agent, preferably water, until solidification is complete. In the last step it is also possible to use only water as foaming agent.

Obviously many modifications and variations of the present invention are possible in the light of the above teachings. It is, therefore, to be understood that within the scope of the appended claims the invention may be practiced otherwise than as specifically described.

We claim:

1. A process for producing a solid mass in which most of the pores are closed from a short type molten slag, obtained as waste product of phosphate reduction furnaces said slag consisting of about 90% calcium metasilicate, about 3% aluminum oxide, about 6% calcium fluoride and up to about 1% manganese and alkali metal oxides, the ratio of calcium oxide to silicon oxide in the foamed slag being about 47:43 parts by weight, said slag being liquid in the molten state and solidifying only within a narrow temperature range, which comprises cooling said molten slag to a temperature of between 1200–1600° C. the point where foaming will occur by constantly admixing said slag in a first expansion zone with water from below, introducing into the slag a further quantity of at least one substance selected from the group consisting of water, steam, and air, transferring the resulting expanded and still pulpy slag mass into a second expansion zone, uniformly distributing the mass in a thin layer in said second zone, and subjecting the mass to dosed quantities of water from below to bring about a second expansion until the solidification is complete.

2. The process of claim 1 wherein the slag is cooled to a temperature between 1400–1500° C.

References Cited by the Examiner

UNITED STATES PATENTS

| | | | |
|---|---|---|---|
| 2,428,249 | 9/47 | Stuart et al. | 65—141 |
| 2,443,103 | 6/48 | Gallai-Hatchard | 65—141 X |
| 2,590,901 | 4/52 | Stout et al. | 65—20 |
| 2,702,967 | 3/55 | Vorwerk | 65—20 |
| 2,716,843 | 9/55 | Stuart | 65—20 |
| 2,778,160 | 1/57 | Gallai-Hatchard | 65—20 |

FOREIGN PATENTS 563,655    8/44    Great Britain.

DONALL H. SYLVESTER, *Primary Examiner.*